(No Model.)

R. S. HAMILTON.
TEA STRAINER.

No. 572,482.        Patented Dec. 1, 1896.

Witnesses

Inventor
Ralph S. Hamilton
by Fenelon B. Brock
Attorney

UNITED STATES PATENT OFFICE.

RALPH S. HAMILTON, OF PROVIDENCE, RHODE ISLAND.

TEA-STRAINER.

SPECIFICATION forming part of Letters Patent No. 572,482, dated December 1, 1896.

Application filed June 30, 1896. Serial No. 597,604. (No model.)

*To all whom it may concern:*

Be it known that I, RALPH S. HAMILTON, a citizen of the United States, residing at Providence, in the county of Providence and State of Rhode Island, have invented certain new and useful Improvements in Tea-Strainers; and I do hereby declare the following to be a full, clear, and exact description of the invention, which will enable others skilled in the art to which it appertains to make and use the same.

My invention relates to combined vessels and strainers.

The objects of my improvements are to provide a cup or bowl shaped vessel with a strainer device located therein and hinged thereto together with a suitable handle and spout for emptying the contents of the vessel.

Figure 1:
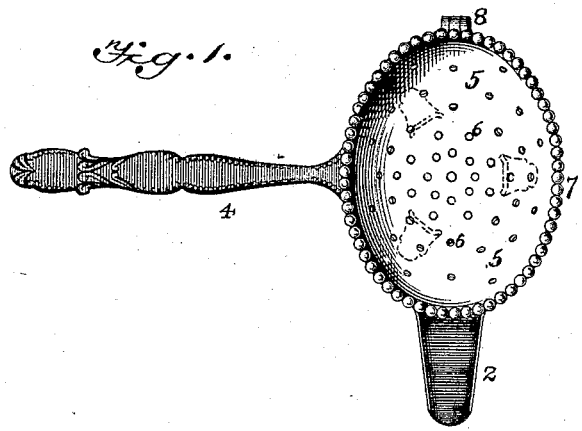
Figure 2:
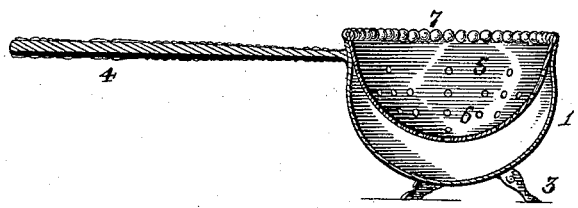
Figure 3:
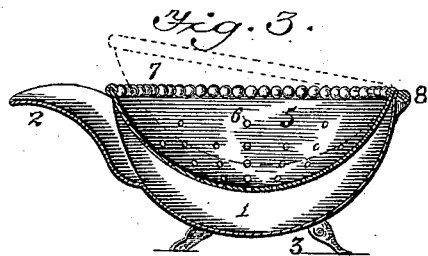

Figure 1 represents a plan view of my invention. Fig. 2 is a central vertical section of the same. Fig. 3 is a side elevation of the device embodying my improvements.

In the drawings, 1 represents the main vessel, which may be of desired shape. It is preferably provided with a spout 2 and legs or other supports 3.

4 is a handle which projects from one side of the vessel.

5 is a strainer having substantially the same bowl or cup shaped configuration as the vessel 1. It is provided with a series of perforations 6 and a rim 7.

8 is a hinge by means of which the strainer 5 is hung upon and within the vessel 1. The position of the hinge 8 is such that the strainer cannot by any means become displaced when the strained contents of the vessel 1 is being poured out from the spout 2. I may, however, locate the hinge at any other desirable point. The strainer 5 lies well within the vessel 1, and is especially well adapted for intercepting the tea-leaves in the process of straining and pouring tea.

The opposite sides of the main vessel 1 in line with the handle 4 are preferably of resilient metal, and the strainer 5 is preferably made slightly larger than the interior diameter of the vessel 1 along said line, whereby the strainer is held within the main vessel by the spring action of the sides of the latter and any accidental displacement of the same prevented.

In a modified form of my invention I may extend a thumb-piece upward from the strainer 7 immediately above the point where the handle joins the main vessel 1, and I may hinge the strainer to the vessel at that point, whereby a slight pressure of the thumb upon this projecting thumb-piece will cause the strainer to swing up out of the bowl.

I contemplate also making the strainer 5 and the handle 4 rigidly united and hinging the vessel 1 immediately below the root of the handle 4 or at a point directly opposite thereto. In such construction the vessel 1, when swung up under the strainer 5, will be held in position by a suitable catch. In the latter modification the vessel 1 may be hinged at the point 8 to the rigidly-united handle and strainer.

By hinging the cup-shaped strainer to the body of the vessel as shown I am enabled to produce an article of manufacture having the following advantages: The strainer is ordinarily held in the left hand by the handle. Should the strainer become clogged with tea-leaves in the operation of pouring tea, the strainer may be upset or turned over by the hand without putting down either the teapot or strainer, so as to throw out the tea-leaves or other matter which would clog the perforated bottom, and the strainer immediately reversed again for use. Again, in washing the strainer after meals the perforated cup-shaped portion may be thrown outwardly by a twist of the hand and the interior of the vessel 1 and exterior of the perforated cup 5 cleansed without removing the hand from the handle or detaching the strainer. The hinged strainer may be thrown back at any time for any purpose by simply vibrating the handle, however.

Having now described my invention, what I claim is—

The herein-described article of manufacture, comprising a spouted and handled vessel provided with a perforated cup-shaped strainer hinged by its outer edge to the outer edge of said vessel and adapted to lie within the same.

RALPH S. HAMILTON.

Witnesses:
OSCAR C. LUFT,
HENRY A. BOLAND.